United States Patent [19]

Alexeeva et al.

[11] 3,870,598

[45] Mar. 11, 1975

[54] INFLUENZAL VACCINE FOR PERORAL ADMINISTRATION AND A METHOD OF PRODUCING SAME

[76] Inventors: Alexandra Konstantinovna Alexeeva, Obolensky pereulok, 9, korpus 6, kv. 24; Ljudmila Alexandrovna Yakovleva, ulitsa Vostrukhina, 6, korpus I, kv. 51; Irina Nikolaevna Vasilieva, Novo-Ostapovskaya ulitsa, 12a, kv. 8; Otar Georgievich Andzhaparidze, Sadovo-Sukharevskaya, 8/12, kv. 43; Angelina Nikolaevna Alexandrova, ulitsa 1812 goda, 1, kv. 139, all of Moscow, U.S.S.R.

[22] Filed: Apr. 1, 1971

[21] Appl. No.: 130,482

[52] U.S. Cl. ................... 195/1.5, 195/1.1, 424/89
[51] Int. Cl. ............................................. C12k 7/00
[58] Field of Search ................................... 424/89; 195/1.1–1.5

[56] References Cited
UNITED STATES PATENTS
3,547,779   12/1970   Machlowitz.......................... 195/1.5

*Primary Examiner*—Richard L. Huff
*Attorney, Agent, or Firm*—Holman and Stern

[57] ABSTRACT

The present invention relates to a novel influenzal vaccine for peroral administration and to a method of producing same. The novel influenzal vaccine for peroral administration contains an apathogenic strain of the type $A_2$ or B influenzal virus adapted to the nephrocytic culture of chick embryo, said strain being grown on nephrocytes taken from developing chick embryos from 17-days old onwards and from chickens up to 3-weeks old, a culture medium containing the sources of carbon and nitrogen, glucose and mineral salts, and features a biological potency not less than $10^{4.5} ID_{50}/1$ ml. A method of producing influenzal vaccine for peroral administration, residing in that to the culture medium containing the source of carbon, nitrogen, glucose, mineral salts, there are added a disintegrated nephric tissue of developing chick embryos from 17-days old onwards and that of chickens up to 3-weeks old, and an apathogenic strain of the type $A_2$ or B influenza virus adapted to the nephrocytic culture of chick embryos, whereupon the resulting mixture is subjected to cultivation at a temperature of 34°–38°C for a period of 48–120 hours and the desired product featuring a biological potency not less than $10^{4.5} ID_{50}/1$ ml, is isolated.

5 Claims, No Drawings

INFLUENZAL VACCINE FOR PERORAL ADMINISTRATION AND A METHOD OF PRODUCING SAME

The present invention relates to the art of medicine and has particular reference to a novel influenzal vaccine for peroral administration and a method of producing same.

Known in the present state of medical art is a prophylactic living influenzal vaccine for intranasal administration which is produced by injecting influenza virus strain into the allantois of 9–10-day-old chicken embryos, cultivating said virus strain and subsequent sucking of allantoic fluid containing influenza virus strain. The resulting vaccine for intranasal administration contains residual ovalbumin, possesses little epidemiological effectiveness, and causes temperature elevation above 37.5°C. within the first days following the vaccination, in up to 2 percent of vaccinated persons.

In addition, the vaccine cannot be used for children less than 12 years old. Unlike the currently employed vaccine, a novel influenzal vaccine proposed by us is suitable both for prophylaxis and for treatment of epidemic influenza. Said new vaccine is a non-reactogenic one and it is thus suitable for administration both in adult humans and in infants from 1 year of age and older. Peroral administration of the vaccine makes mass vaccination simpler.

According to the invention a novel influenzal vaccine for peroral administration contains an apathogenic influenza virus strain adapted to the nephrocytic culture of chicken, said virus strain being grown on the nephrocytes of developing chick embryos from 17-days old onwards and on chickens up to 3-weeks old, and nutrient medium comprising sources of carbon, nitrogen, glucose and mineral salts, said vaccine featuring a biological potency not less than $10^{4.5} ID_{50}/1$ ml.

Type $A_2$ influenzal vaccine contains an apathogenic strain of the type $A_2$ influenza virus adapted to the nephrocytic culture of chicken and grown on the nephrocytes of developing 19-day-old chick embryos, Parker–199 culture medium, and features a biological potency not less than $10^{4.5} ID_{50}/1$ ml.

Type B influenzal vaccine contains an apathogenic strain of the type B influenza virus adapted to the nephrocytic culture of chicken and grown on the nephrocytes of developing 19-day-old chick embryos, Parker-199 culture medium, cattle serum in an amount of 2–5 vol. percent with respect to the culture medium, and features a biological potency not less than $10^{4.5} ID_{50}/1$ ml.

The herein-proposed influenzal vaccine for peroral administration is employed as a prophylactic means to prevent epidemic influenza and, in addition, can be used, due its interferonogenic effect, for treatment of influenza and other virus-incited infectious diseases of the respiratory tract.

The novel vaccine was tested as a means of specific vaccinoprophylaxis (vaccination starting 1–3 months before the onset of epidemic influenza), an emergency prophylaxis (in case an epidemic breaks out), as well as a means for treatment of influenza.

According to test data, the vaccine proves to be antigenic active. A four-fold or higher increment of antibodies is observed mostly in persons possessing a low prevaccination hemagglutinins titre. An increment in the anti-bodies specific to the type $A_2$ influenzal virus was observed in 23.7–50 percent of investigated persons, and those to the type B influenzal virus, in 6.1–8.8 percent (a group of sero-negative persons).

In specific vaccinoprophylaxis the total quantity of vaccinated persons amounted to 6,8385, while that of non-vaccinated, to 5,0356 persons, the effectivity index ranging from 1.5 to 2.9. No correlation between the antigenic activity indices and effectivity index was observed.

More pronounced effectivity was observed in vaccination under the conditions of a broken up epidemic. The effectivity index in emergency prophylaxis was found to equal 2.2–3.00.

A less grave and shorter course of influenzal disease was found in those vaccinated. An average duration of the disease in vaccinated persons was found to be 1.2–3 times shorter. In addition, a lower number of post-influenzal complications was observed in vaccinated persons. Thus, the cases of pneumonia found in those vaccinated was 1.5–2 times as rare as in nonvaccinated.

The curing effect of the vaccine was also established. The total number of persons given the vaccine was 846 and the number of those who passed a symptomatic treatment was 768.

Apart from a shorter pyretic period and elimination of intoxication, the favourable effect of the vaccine was shown in the number of complicated cases which was found to occur 2.5–3.3 times as low in patients given the vaccine.

The present influenzal vaccine for peroral administration may be administered both in liquid and dry state. Dry vaccine should be dissolved in cooled down boiled water immediately before vaccination. Prophylactic vaccination is carried out in three stages at a 10–15-day interval during the autumn and winter seasons.

A single prophylactic vaccinating dose for adult humans and children older than 8-years of age is 2 ml, for infants of 1 to 3 years old, 0.5 ml and for children of 3 to 7 years old, 1 ml.

A single vaccinating dose in case of emergency prophylaxis and treatment for adult humans is 5 ml, for infants of 1 to 3 years old, 1 ml, for children of 3 to 7 years old, 2 ml and for those of 8 to 16 years old, 3 ml.

It is recommended that in the centers of influenza all patients and those contacting them be given the vaccine once a day within the first 2 days after the onset of the disease.

For controlling an outbreak of epidemic influenza in large concentrations of people the vaccine is recommended to be administered 3–4 times at an interval of 6–8 days.

The vaccine is administered irrespective of taking meals and can be washed down with water, milk, cool tea. Liquid vaccine should not be diluted. The diluted dry vaccine must be administered at once and in no case is suitable for storage for any length of time. The administration of the vaccine causes no temperature elevation above 37.5°C either in children or in adult humans. Some susceptible persons feel non-lasting headache, nausea or, xerostomia. Contraindications to vaccination are: chronic pulmonary diseases, tuberculosis in the active stage, cardiovascular insufficiency in the second and third degree, state of pregnancy and pyrogenic diseases of the bacteria etiology.

Both liquid and dry vaccine is to be stored at a temperature of not above +6°C. At such a temperature the liquid vaccine may be stored for 3 months, and at a temperature of −20°C, the liquid vaccine may be stored for 6 months. The dry vaccine may be stored 1 year.

A method of producing said novel influenzal vaccine for peroral administration, according to the present invention, involve the addition to a disintegrated nephric tissue taken of developing chick embryos from 17-days old onwards and of chickens up to 3-weeks old of a culture medium containing sources of carbon and nitrogen, glucose, mineral salts, and an apathogenic influenza virus strain adapted to the nephrocytic culture of chick embryos, following which the resulting mixture is subjected to cultivation at a temperature of 34°–38°C for a period of 48–120 hours and the desired product is isolated therefrom.

To produce dry vaccine, there is added to the virus-containing fluid resulting from the cultivation process, a stabilizer enabling lyophilization, whereupon said fluid is lyophilically dried.

It is expedient that use be made as a stabilizer, of a 10-percent aqueous solution of peptone taken in a ratio of 1:1 with respect to the virus-containing fluid.

For obtaining an influenzal vaccine against the type $A_2$ influenza virus, to a disintegrated nephric tissue of 19-day old chick embryos are added the Parker–199 culture medium, an apathogenic strain of the type $A_2$ influenzal virus adapted to the nephrocytic culture of chick embryos, taken in an amount of $10^6$–$10^7 ID_{50}$ per litre of the culture medium, whereupon the mixture is subjected to cultivation under stirring at a temperature of 36°–37°C for a period of 48–72 hours, followed by isolating the desired product therefrom.

For obtaining an influenzal vaccine against the type B influenzal virus, to a disintegrated nephric tissue of 19-day old chick embryos are added the Parker–199 culture medium, 2.5 vol. percent of a warmed up cattle serum (with respect to the culture medium) and an apathogenic strain of the type B influenzal virus adapted to the nephrocytic culture of chick embryos, taken in an amount of $10^3$–$10^4$ $ID_{50}$ per litre of the culture medium, whereupon the mixture is subjected to cultivation under stirring at a temperature of 36°–37°C for a period of 96–120 hours and the desired product is isolated therefrom.

The method of producing influenzal vaccine is carried out as follows:

To a disintegrated nephric tissue taken from developing chick embryos from 17-days old onwards and from chickens up to 3-weeks old, preferably from 19-day-old chick embryos, is added a culture medium. Use is made as said culture medium of, say, the Parker–199 medium or the Parker–199 medium with an addition of 2.5 vol. percent of a warmed up cattle serum which is preferably added in case of using the type B influenzal virus, in order to improve the condition of and prolong the vital activity of nephrocytes.

Next the strain of the type $A_2$ or B influenzal virus adapted to the nephrocytic culture of chick embryos is inoculated. The cultivation process is run at 36°–37°C under constant stirring for a period of 48–120 hours. The optimum term of cultivation of the type $A_2$ influenzal virus is a period of 48–72 hours, while for the type B virus the optimum term is, 96–120 hours. Upon terminating the cultivation process a liquid influenzal vaccine results, featuring a biological potency not less than $10^{4.5}ID_{50}/1$ ml. The ready vaccine is subjected to test inspections for biological potency, bacteriological sterility and specificity.

Once the vaccine has passed the above tests, it is dispensed into flasks and kept at a temperature not greater than +6°C. To obtain dry vaccine the virus-containing fluid resulting from the cultivation process is mixed with a stabilizer and subjected to lyophilization.

It is preferable to employ as a stabilizer, a 10-percent aqueous solution of peptone, taken at a ratio of 1:1 with respect to the virus-containing fluid.

Described below are exemplary embodiments of a method of producing influenzal vaccine for peroral administration in accordance with the present invention.

EXAMPLE 1

To 10 litres of Parker–199 culture medium is added nephric tissue taken from 40 19-day-old chick embryos, whereupon introduced thereinto is the strain of the type $A_2$ influenzal virus adapted to the nephrocytic culture of chick embryos, taken in an amount of $10^8 ID_{50}$. The cultivation process occurs at 36°–37°C with stirring for 72 hours. Upon terminating the cultivation process a vaccine is obtained which is then tested for biological potency, sterility and specificness. The resulting vaccine is specific, sterile and features a biological potency of $10^{5.5}ID_{50}/1$ ml.

EXAMPLE 2

To 10 litres of the Parker–199 culture medium are added 2 vol. percent of a warmed up cattle serum and a disintegrated nephric tissue taken from 40, 19-day-old chick embryos. The resulting mixture is inoculated with the strain of the type B influenza virus adapted to the nephrocytic culture of chick embryos, taken in an amount of $10^4 ID_{50}$.

The cultivation process is run at 36°–37°C with stirring for 120 hours. Upon terminating the cultivation process a vaccine is obtained which is then tested for biological potency, sterility and specificness. The resulting vaccine is specific, sterile and features a biological potency of $10^{5.0}ID_{50}/1$ ml.

EXAMPLE 3

The process is run similarly to Example 1. To 10 litres of a liquid vaccine with a potency of $10^{5.5}ID_{50}/1$ ml are added 10 litres of a 10-percent aqueous solution of peptone and the resulting mixture is lyophilically dried to obtain dry vaccine having a potency of $10^{4.5}ID_{50}/1$ ml.

What we claim is:

1. A method of preparing an influenzal virus for peroral administration as a vaccine which comprises adding to a culture medium containing sources of carbon, nitrogen, glucose and mineral salts a disintegrated nephric tissue obtained from chick nephrocytes from chick embryos at least 17 days-old up to chickens at most 3 weeks-old, and an apathogenic influenza virus strain adapted to a culture of chick nephrocytes cultivating the resulting mixture at a temperature of 34°–38°C for a period of 48–120 hours, and isolating the desired product.

2. A method as claimed in claim 1, wherein for obtaining a dry vaccine, a stabilizer permitting lyophilization to occur is added to the virus-containing fluid obtained after cultivation, and the resulting mixture is lyophilized.

3. A method as claimed in claim 2, wherein a 10 percent aqueous solution of peptone taken in a ratio of 1:1 with respect to the virus-containing fluid is used as the stabilizer permitting lyophilization to occur.

4. A method as claimed in claim 1 which comprises adding to a Parker-199 culture medium a disintegrated nephric tissue of 19 day-old chick embryos taken in an amount of at least four embryos per litre of the culture medium and an apathogenic strain of type $A_2$ influenza virus adapted to the nephrocytic culture of chick embryos taken in an amount of $10^6 - 10^7 ID_{50}$ per litre of the culture medium, cultivating the mixture with stirring at a temperature of 36°–37°C for a period of 48–72 hours and isolating the desired product.

5. A method as claimed in claim 1 which comprises adding to a Parker-199 culture medium a warmed up cattle serum taken in an amount of 2–5 vol. percent of the total amount of the culture medium, a disintegrated nephric tissue of 19 day-old chick embryos taken in an amount of at least four embryos per litre of the culture medium and a type B influenza virus strain taken in an amount of $10^3 - 10^4 ID_{50}$ per litre of the culture medium, cultivating the mixture with stirring at a temperature of 36°–37°C for a period of 96–120 hours, and isolating the desired product.

* * * * *